(12) United States Patent
Marrion et al.

(10) Patent No.: US 10,706,528 B2
(45) Date of Patent: Jul. 7, 2020

(54) DETECTING OBJECT PRESENCE ON A TARGET SURFACE

(71) Applicant: COGNEX CORPORATION, Natick, MA (US)

(72) Inventors: Cyril C. Marrion, Acton, MA (US); Nickolas James Mullan, Ambler, PA (US)

(73) Assignee: Cognex Corporation, Natick, MA (US)

( * ) Notice: Subject to any disclaimer, the term of this patent is extended or adjusted under 35 U.S.C. 154(b) by 0 days.

(21) Appl. No.: 15/985,456

(22) Filed: May 21, 2018

(65) Prior Publication Data

US 2019/0026887 A1    Jan. 24, 2019

Related U.S. Application Data

(63) Continuation of application No. 14/634,717, filed on Feb. 27, 2015, now Pat. No. 9,978,135.

(51) Int. Cl.
*G06T 7/00* (2017.01)
*G06T 7/80* (2017.01)
*G06K 9/00* (2006.01)

(52) U.S. Cl.
CPC .............. *G06T 7/0008* (2013.01); *G06T 7/85* (2017.01); *G06K 9/00* (2013.01);
(Continued)

(58) Field of Classification Search
CPC ........... G06T 7/593; G06T 2207/10021; G06T 2207/10012; G06T 7/85; G06T 7/20; G06T 7/0008; G06T 7/60; G06T 7/97; G06T 17/00; G06T 2207/10028; G06T 2207/30208; G06T 2207/20228; G06T 7/55; G06T 7/596; G06T 2219/2004;
(Continued)

(56) References Cited

U.S. PATENT DOCUMENTS

| 4,695,156 A * | 9/1987 | Taft ........................ G01S 11/12 |
| | | 348/139 |
| 7,660,458 B1 | 2/2010 | Saric |

(Continued)

OTHER PUBLICATIONS

Lovegrove, W., "Single-Camera Stereo Vision for Obstacle Detection in Mobile Robots", SPIE Newsroom, doi:10.1117/2.1200710.0911, 2007.

*Primary Examiner* — Aklilu K Woldemariam
(74) *Attorney, Agent, or Firm* — Proskauer Rose LLP

(57) ABSTRACT

Described are methods, systems, apparatus, and computer program products for determining the presence of an object on a target surface. A machine vision system includes a first image capture device configured to image a first portion of a target surface from a first viewpoint and a second image capture device configured to image a second portion of the target surface from a second viewpoint. The machine vision system is configured to acquire a first image from the first image capture device, a second image from the second image capture device, rectify the first image and second image, retrieve a disparity field, generate difference data by comparing, based on the mappings of the disparity field, image elements in the first rectified image and a second image elements in the second rectified image; and determine whether the difference data is indicative of an object on the target surface.

16 Claims, 10 Drawing Sheets

(52) U.S. Cl.
CPC ............... *G06T 2207/10012* (2013.01); *G06T 2207/10028* (2013.01); *G06T 2207/30208* (2013.01)

(58) Field of Classification Search
CPC ......... G06T 7/285; G06T 7/80; G06K 9/3241; G06K 9/00778; G06K 9/00771; G06K 9/52; G06K 9/00; G06K 2209/40; G06K 9/00664; G06K 9/00228; H04N 13/239; H04N 2013/0074; H04N 2013/0081; H04N 13/275; H04N 2013/0085; H04N 5/332; H04N 13/282; H04N 13/00; H04N 13/243; H04N 13/189; F16P 3/142; G01H 9/00; G01C 11/06; G06N 3/08; G06F 3/0304; G05D 1/0274; B60R 2300/107
USPC .... 348/42, 47, 189; 382/103, 154, 141, 195, 382/285
See application file for complete search history.

(56) References Cited

U.S. PATENT DOCUMENTS

| | | | | |
|---|---|---|---|---|
| 8,009,897 | B2* | 8/2011 | Xu ........................... | G06K 9/32 382/154 |
| 8,326,084 | B1* | 12/2012 | Marrion, Jr. ....... | G06K 9/00778 382/285 |
| 8,593,524 | B2 | 11/2013 | Kleihorst | |
| 9,325,973 | B1* | 4/2016 | Hazeghi ............. | G01B 11/2513 |
| 2004/0240725 | A1* | 12/2004 | Xu ........................... | G06K 9/32 382/154 |
| 2004/0264763 | A1* | 12/2004 | Mas ....................... | G01C 23/00 382/154 |
| 2005/0093697 | A1* | 5/2005 | Nichani ............. | G06K 9/00778 340/545.1 |
| 2005/0100207 | A1* | 5/2005 | Konolige .................. | G06T 7/20 382/154 |
| 2005/0249382 | A1* | 11/2005 | Schwab ............. | G06K 9/00778 382/115 |
| 2006/0210146 | A1* | 9/2006 | Gu ........................ | G01B 11/25 382/154 |
| 2010/0007720 | A1* | 1/2010 | Murali ..................... | G06T 7/97 348/47 |
| 2010/0020178 | A1* | 1/2010 | Kleihorst .................. | G06T 7/85 348/175 |
| 2010/0166294 | A1* | 7/2010 | Marrion ............. | G06K 9/00214 382/154 |
| 2011/0050853 | A1 | 3/2011 | Zhang et al. | |
| 2012/0039525 | A1 | 2/2012 | Tian | |
| 2012/0105602 | A1 | 5/2012 | McNamer et al. | |
| 2012/0162379 | A1 | 6/2012 | Dahi et al. | |
| 2012/0212627 | A1* | 8/2012 | Klose ................... | H04N 9/3182 348/189 |
| 2012/0242806 | A1 | 9/2012 | Ibrahim et al. | |
| 2013/0057644 | A1 | 3/2013 | Stefanoski et al. | |
| 2013/0094705 | A1* | 4/2013 | Tyagi ................. | G06K 9/00369 382/103 |
| 2013/0177237 | A1* | 7/2013 | Schamp ............. | G06K 9/00805 382/154 |
| 2014/0153831 | A1 | 6/2014 | Ishiyama | |
| 2014/0362192 | A1* | 12/2014 | Lin ....................... | H04N 13/221 348/50 |
| 2015/0055821 | A1* | 2/2015 | Fotland ................ | G06K 9/3241 382/103 |
| 2015/0077323 | A1* | 3/2015 | Ramaswamy .......... | G06F 3/012 345/156 |
| 2016/0188994 | A1* | 6/2016 | Wu ........................ | G06T 7/593 382/195 |
| 2016/0203371 | A1* | 7/2016 | Tyagi .................. | G06K 9/00771 382/103 |
| 2016/0253793 | A1* | 9/2016 | Marrion ................ | G06T 7/0008 382/141 |

\* cited by examiner

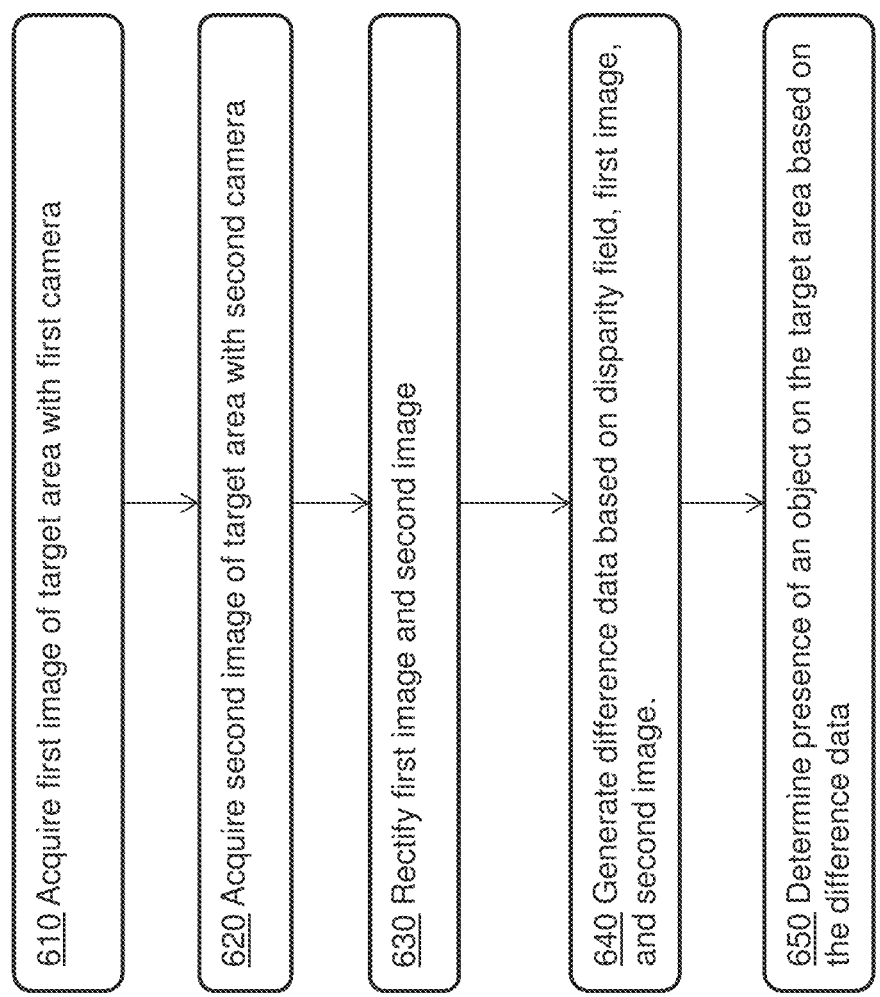

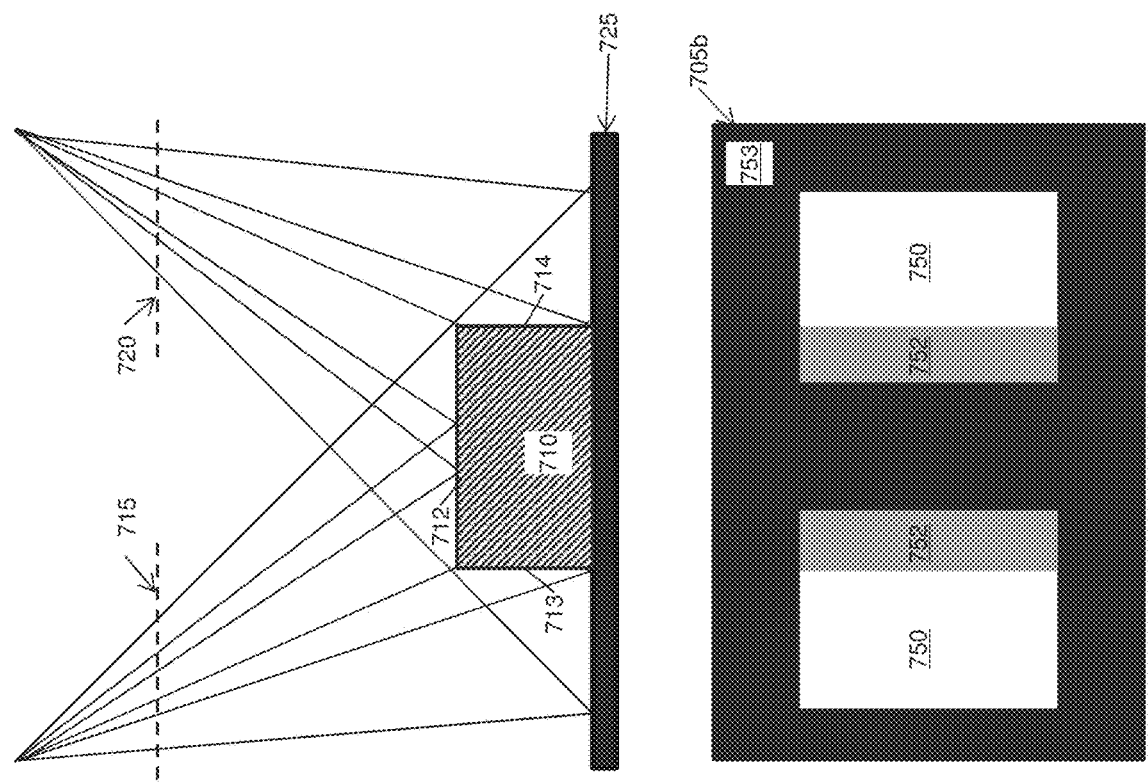

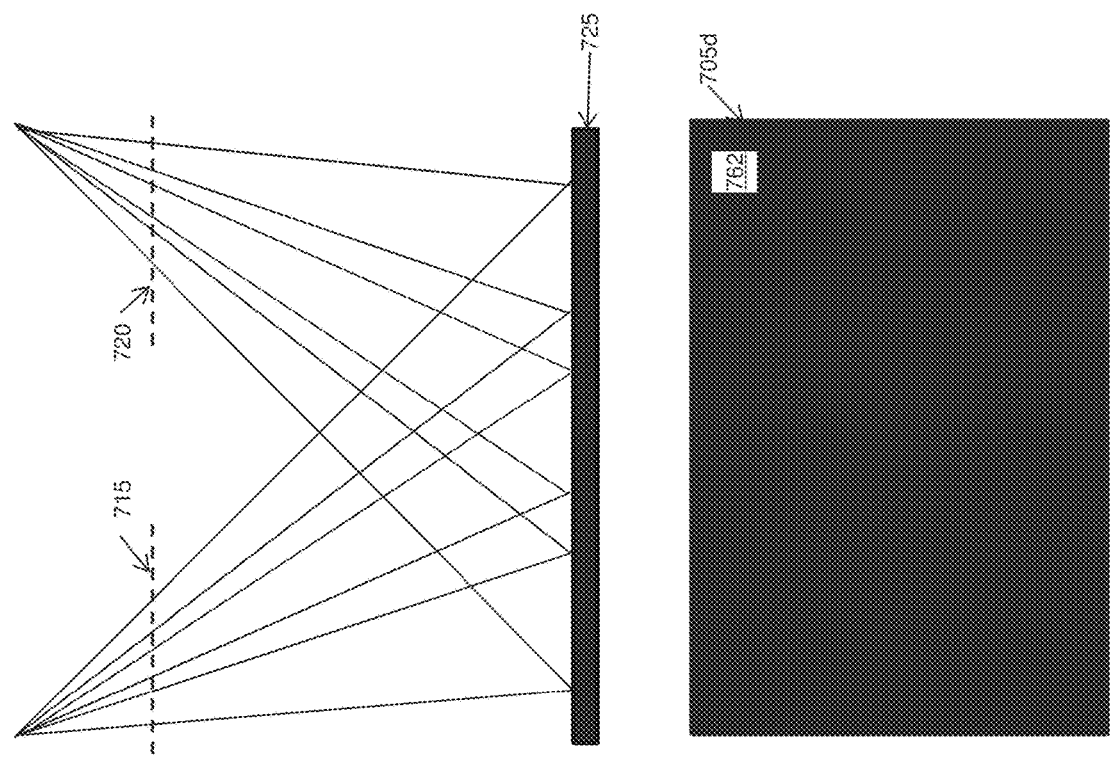

DETECTING OBJECT PRESENCE ON A TARGET SURFACE

RELATED APPLICATIONS

This application is a continuation of U.S. patent application Ser. No. 14/634,717, filed on Feb. 27, 2015, the entirety of which is incorporated herein by reference.

TECHNOLOGICAL FIELD

The present technology relates generally to detecting the presence of an object on a target surface and, more specifically, to using stereoscopic imaging to detect the presence of an object on a target surface.

BACKGROUND

Many commercial applications involve placing objects on target surfaces for later processing and/or use. Some applications involve placing objects, such as packages, product parts, or components, in trays, bowls, or other receptacles for transport along conveyor belts. For example, in some logistic applications, objects are placed on trays running along a conveyor belt for automated sorting. In some instances, an unexpected occupied receptacle can cause disruptions to the process, resulting in reduced efficiency. In some instances, the presence of an object can indicate a failure of an upstream process.

SUMMARY

Accordingly, there is a need for technology to determine the presence or absence of objects on a target surface, such as the bottom of a tray, bowl, or other receptacle. Beneficially, the technology described herein can facilitate detecting the presence or absence of such objects using stereoscopic imaging.

In one aspect, there is a machine vision system. The machine vision system includes a first image capture device configured to image a first portion of a target surface from a first viewpoint. The machine vision system includes a second image capture device configured to image a second portion of the target surface from a second viewpoint, wherein the first portion of the target surface at least partially overlaps the second portion of the target surface. The machine vision system includes a machine vision processor connected to the first image capture device and the second image capture device, the machine vision processor configured to: acquire a first image of the target surface from the first image capture device; acquire a second image of the target surface from the second image capture device; rectify the first image to form a first rectified image and rectify the second image to form a second rectified image; retrieve a disparity field that provides mappings from a first plurality of coordinates in the first rectified image to a second plurality of coordinates in the second rectified image; generate difference data by comparing, based on the mappings of the disparity field, a first plurality of image elements in the first rectified image to a second plurality of image elements in the second rectified image; and determine whether the difference data is indicative of an object on the target surface.

In some embodiments, the first image capture device and the second image capture device are a camera and, wherein the camera is configured to image the first portion of the target surface from the first viewpoint and image the second portion of the target surface from the second viewpoint approximately simultaneously. In some embodiments, the first image capture device is a first camera and the second image capture device is a second camera. In some embodiments, the machine vision processor is configured to acquire the first image and the second image substantially simultaneously. In some embodiments, the first plurality of image elements is a first plurality of pixel values. In some embodiments, the plurality of pixel values are at least one of grey scale values, hue values, gradient values, and reflectance values. In some embodiments, the target surface is one of a conveyor belt, tray and a receptacle. In some embodiments, the difference data comprises a plurality of difference values, and wherein the machine vision processor is configured to form the difference data by, for each image element of the first plurality of image elements: generating a difference value by applying one or more difference functions to the element and a corresponding element of the second plurality of image elements, wherein a correspondence between the element and the corresponding element is based on the disparity field. In some embodiments, the machine vision processor is configured to apply at least one of a filtering algorithm and a shape-finding algorithm to the difference data to determine whether the difference data is indicative of the object on the target surface.

In another aspect, there is a method executed by a machine vision system. The method includes acquiring, by the machine vision system, a first image of the target surface from a first viewpoint. The method includes acquiring, by the machine vision system, a second image of the target surface from a second viewpoint, wherein the first image and the second image are captured from distinct viewpoints. The method includes rectifying, by the machine vision system, the first image to form a first rectified image and the second image to form a second rectified image. The method includes retrieving, by the machine vision system, a disparity field that provides mappings from a first plurality of coordinates in the first rectified image to a second plurality of coordinates in the second rectified image. The method includes generating, by the machine vision system, difference data by comparing, based on the mappings of the disparity field, a first plurality of image elements in the first rectified image to a second plurality of image elements in the second rectified image. The method includes determining, by the machine vision system, whether the difference data is indicative of an object on the target surface.

In some embodiments, the first image and the second image are captured by a camera and, the camera is configured to image the target surface from the first viewpoint and image the target surface from the second viewpoint approximately simultaneously. In some embodiments, the first image is captured by a first camera and the second image is captured by a second camera. In some embodiments, the method includes acquiring the first image and the second image substantially simultaneously. In some embodiments, the first plurality of image elements is a first plurality of pixel values. In some embodiments, the plurality of pixel values are at least one of grey scale values, hue values, gradient values, and reflectance values. In some embodiments, the target surface is one of a conveyor belt, a tray, and a receptacle. In some embodiments, the difference data comprises a plurality of difference values, and the method further includes forming the difference data by, for each image element of the first plurality of image elements: generating a difference value by applying one or more difference functions to the element and a corresponding element of the second plurality of image elements, wherein a correspondence between the element and the corresponding element is based on the disparity field. In some embodiments, the method includes applying, by the machine vision system, at least one of a filtering algorithm and a shape-finding algorithm to the difference data to determine whether the difference data is indicative of the object on the target surface.

Other aspects and advantages of the present technology will become apparent from the following detailed description, taken in conjunction with the accompanying drawings, illustrating the principles of the technology by way of example only.

BRIEF DESCRIPTION OF THE DRAWINGS

The foregoing and other objects, features, and advantages of the present technology, as well as the technology itself, will be more fully understood from the following description of various embodiments, when read together with the accompanying drawings, in which:

FIG. 6 depicts a flowchart for a method of determining the presence or absence of an object on a target surface.

FIGS. 7A-7D illustrate the difference data generated when imaging a target surface tray.

DETAILED DESCRIPTION

The present technology can facilitate determining the presence or absence of an object on a target surface using stereoscopic imaging. In an exemplary embodiment of the technology, a machine vision system can detect the presence or absence of an object in a tray. The exemplary machine vision system includes two cameras in fixed positions for imaging the upward-facing surface of the bottom of the tray. The cameras are positioned at distinct viewpoints, and so that the cameras' fields of view at least partially overlap (e.g., the same portion of the tray is in both cameras' fields of view). During calibration of the machine vision system, the machine vision system can generate a disparity field. The disparity field provides mappings between the pixels of a rectified image from the first camera and the corresponding pixels of a rectified image from the second camera for the tray's surface, when the images are captured substantially simultaneously. For example, the disparity field provides a mapping between a point on the tray's surface in a rectified image from the first camera and the same point on the tray's surface in a rectified image from the second camera.

During operation, the exemplary machine vision system can capture images of the tray with the two cameras substantially simultaneously. Using the disparity field, the machine vision system can compare values of pixels in the rectified image from the first camera to values of corresponding pixels in the rectified image from the second camera. If the tray is empty, the values of corresponding pixels will be same, or approximately the same. If the tray contains an object (e.g., an object of some thickness and of a different color than the tray), at least some of the values of the pixels in the rectified image from the first camera will not match the values of corresponding pixels in the rectified image from the second camera. The machine vision system can detect whether an object is present or not based on these differences in the values of corresponding pixels in the images.

Machine Vision Systems

Figure 1:
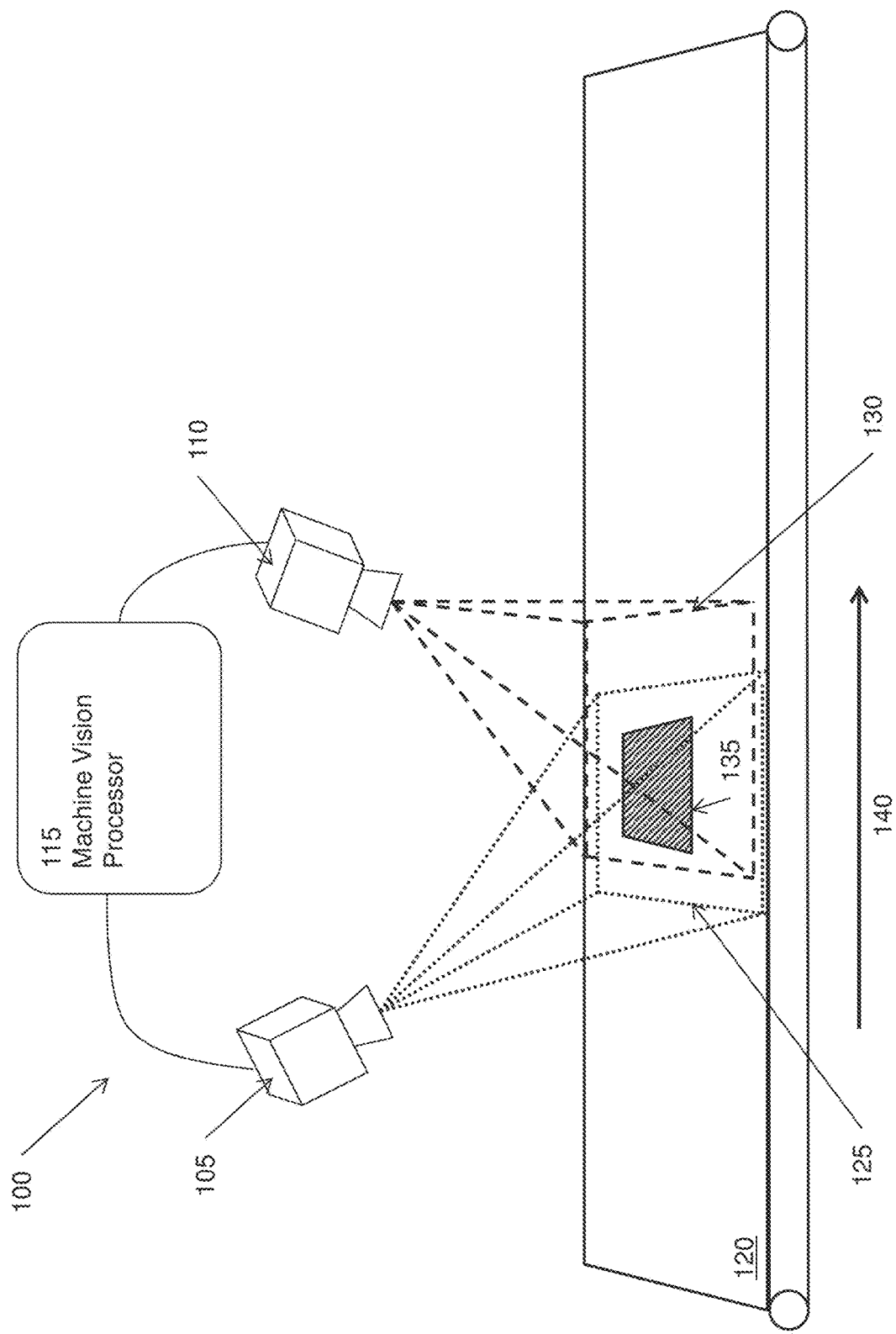
FIG. 1 depicts a machine vision system in accordance with the technology.

Referring now to the drawings, exemplary embodiments of the technology will be described. FIG. 1 depicts machine vision system 100 in accordance with the technology. System 100 includes camera 105, camera 110, machine vision processor 115, and conveyor belt system 120. In the illustrated embodiment, cameras 105 and 110 can be area-scan cameras including a two-dimensional CCD camera sensor, a two-dimensional CMOS camera sensor or any other type of camera sensor for generating images of items on conveyor belt system 120. Camera 105 can have field of view 125. Camera 105 can generate two-dimensional images of field of view 125, including objects within field of view 125. Camera 110 can have field of view 130. Camera 110 can generate two-dimensional images of field of view 130, including objects within field of view 130. Fields of view 125 and 130 are roughly overlapping. Cameras 105 and 110 can provide the two-dimensional images to machine vision processor 115 for machine vision processing, as will be described in greater detail below. During operation, conveyor belt system 120 can convey objects (e.g., tray 135) in the direction of arrow 140 such that the objects are moved through fields of view 125 and 130. In the illustrated embodiment, cameras 105 and 110 can capture images of objects on conveyor belt system 120 approximately simultaneously. In some embodiments, a machine vision system in accordance with the technology can include lighting (e.g., strobe lights) to facilitate image acquisition. In some embodiments, more than 2 cameras can be used.

In the illustrated embodiment, machine vision processor 115 can be any processing device (e.g., embedded machine vision processor, computing device, etc.). In some embodiments, machine vision processor 115 can be and/or be a part of a standalone computing device. In some embodiments, machine vision processor 115 can be a part of camera 105 and/or camera 110. More generally, machine vision processor 115 can be any processor or set of processors programmed to perform machine vision processing. Machine vision processor 115 can receive data from cameras 105 and 110 (e.g., image data) and perform machine vision processing on the data, as will be described in greater detail below. For example, in some embodiments, machine vision processor 115 can determine whether tray 135 contains an object based on the images from cameras 105 and 110.

Figure 2:
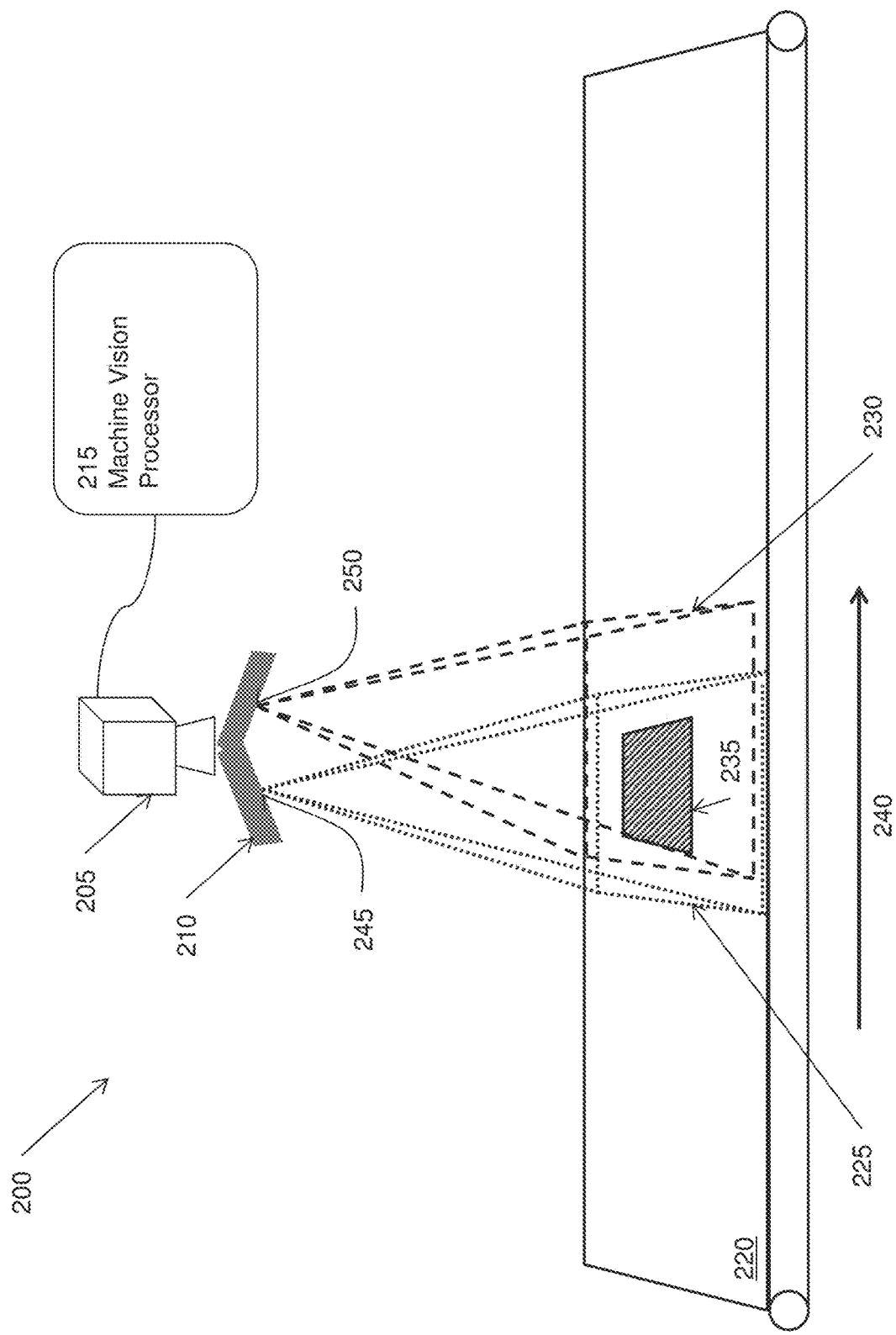
FIG. 2 depicts a machine vision system in accordance with the technology.

FIG. 2 depicts machine vision system 200 in accordance with the technology. System 200 includes camera 205, stereo view expander 210, machine vision processor 215, and conveyor belt system 220. In the illustrated embodiment, camera 205 can be an area-scan camera including a two-dimensional CCD camera sensor, a two-dimensional CMOS camera sensor or any other type of camera sensor for generating images of items on conveyor belt system 220. As illustrated, camera 205 can include stereo view expander (SVE) 210. SVE 210 is configured to allow camera 205 to image two roughly overlapping fields of view, fields of view 225 and 230, from two distinct viewpoints, viewpoints 245 and 250 respectively, simultaneously by projecting field of view 225 on a portion of the sensor of camera 205 and field of view 230 on another portion of the sensor of camera 205. For example, the top half of an image captured by camera 205 can be of field of view 225 and the bottom half of the image can be of field of view 230. Beneficially, SVE 210 can allow the present technology to be implemented using a single camera. An example of an optical system that can be used as an SVE is described in W. Lovegrove, *Single-camera stereo vision for obstacle detection in mobile robots*, SPIE Newsroom, 2007; doi:10.1117/2.1200710.0911, the entire contents of which are hereby incorporated by reference. During operation, conveyor belt system 220 can convey objects (e.g., tray 235 containing an object) in the direction of arrow 240 such that the objects are moved through fields of view 225 and 230. The invention also contemplates and includes other camera and optical path splitter embodiments whereby roughly overlapping fields of view are acquired from different viewpoints.

In the illustrated embodiment, machine vision processor 215 can be any processing device (e.g., embedded machine vision processor, computing device, etc.). In some embodiments, machine vision processor 215 can be and/or be a part of a standalone computing device. In some embodiments, machine vision processor 215 can be a part of camera 205. More generally, machine vision processor 215 can be any processor or set of processors programmed to perform machine vision processing. Machine vision processor 215 can receive data from camera 205 (e.g., image data) and perform machine vision processing on the data. For example, in some embodiments, machine vision processor 215 can determine whether tray 235 contains an object based on the image from camera 205. It should be appreciated that disclosure herein that refers to aspects of the technology involving images from separate cameras can also apply to the portions of an image captured using an SVE that capture roughly overlapping fields of view.

Overview of Determining the Presence of an Object

Figure 3B:
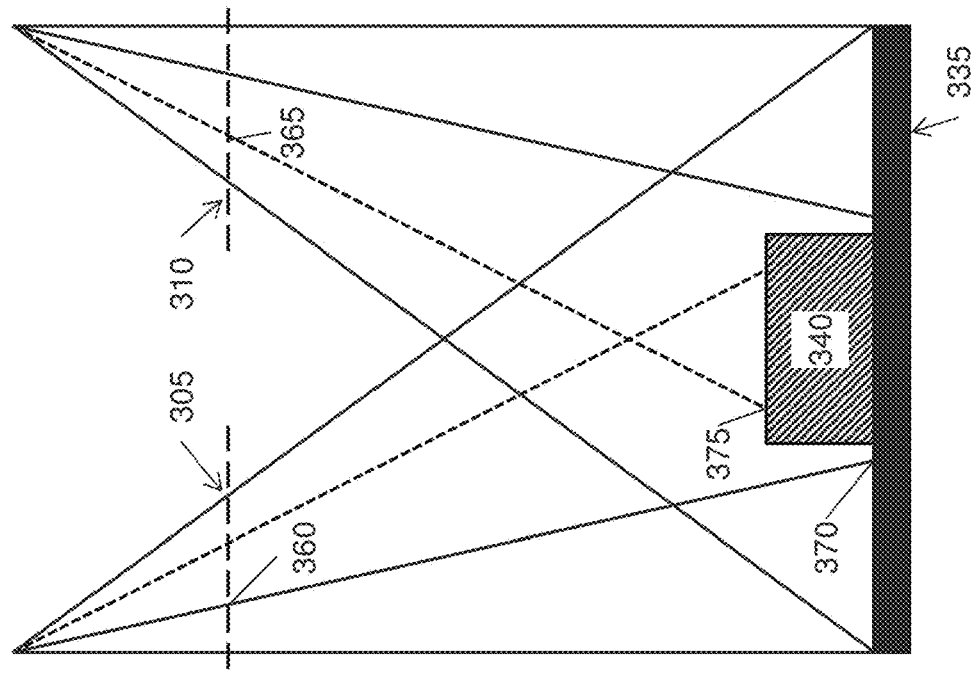
FIGS. 3A and 3B illustrate a technique for determining the presence or absence of an object in accordance with the technology.
Figure 3A:
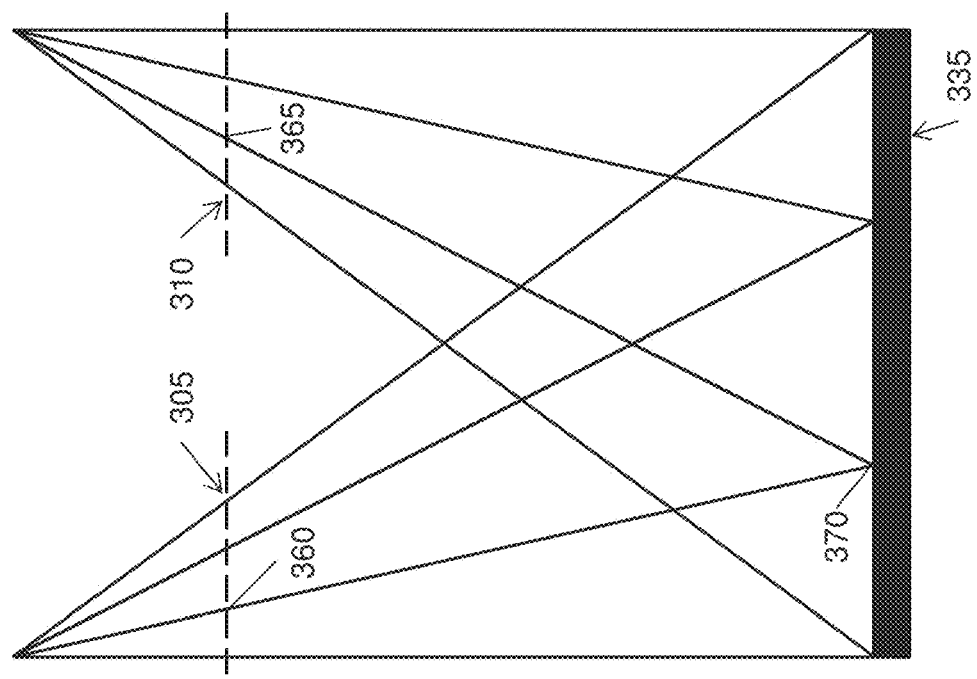

FIGS. 3A and 3B illustrate a technique for determining the presence or absence of an object in accordance with the technology. In FIGS. 3A and 3B, tray 335 is depicted as empty (FIG. 3A) and containing object 340 (FIG. 3B). Rectified image planes 305 and 310 represent the rectified image planes for two cameras (e.g., cameras 105 and 110) or a camera using an SVE (e.g., camera 205). As illustrated in FIG. 3A, when tray 335 is empty, point 360 in rectified image plane 305 and point 365 in rectified image plan 310 both correspond to point 370 on tray 335. Accordingly, a pixel at point 360 in an image in rectified image plane 360 will have approximately the same value as a pixel at point 365 in an image in rectified image plane 310 because both pixels represent the point 370 on tray 335. Turning to FIG. 3B, when tray 335 contains object 340, point 360 in rectified image plane 305 corresponds to point 370 on tray 335, while point 365 in rectified image plane 310 corresponds to point 375 on object 340. Accordingly, a pixel at point 360 in an image in rectified image plane 360 will a have a different value than a pixel at point 365 in an image in rectified image plane 310, provided, e.g., object 340 is an object of some thickness and a different color than tray 335.

As explained in greater detail below, the technology involves detecting these differences in pixel values to determine if the target surface (e.g., a tray) contains an object.

System Assembly and Calibration

In some embodiments, the technology includes assembling and calibrating a machine vision system. For example, machine vision system 100 of FIG. 1 and/or machine vision system 200 of FIG. 2 can be assembled and calibrated in accordance with the technology. In some embodiments one or more cameras can be mounted in fixed positions relative to the target surface. For example, as illustrated in FIG. 1, cameras 105 and 110 can be mounted in fixed positions relative to conveyor belt system 120. In some embodiments, a single camera with an SVE can be used (e.g., as illustrated in FIG. 2). In some embodiments, lighting can be used to facilitate image acquisition. For example, a strobe light can be positioned to illuminate the target surface and triggered during image acquisition. In some embodiments using more than one camera, the exposure, gain, and/or offset of the cameras can be adjusted such that pixel values in the cameras are approximately the same when imaging the same point on the same object. In some embodiments, the cameras can be calibrated, in part, using conventional calibration techniques. Additional information regarding camera calibration can be found in U.S. Pat. No. 6,798,925, titled METHOD AND APPARATUS FOR CALIBRATING AN IMAGE ACQUISITION SYSTEM, and "Multiple view Geometry in Computer Vision" Second Edition, Richard Hartley and Andrew Zisserman (2004), the entire contents of which are hereby incorporated by reference.

In some embodiments, the transforms required to rectify images from the cameras can be calculated using conventional image rectification techniques. Techniques for calculating image rectification transforms are well known in the art for coplanar alignment of camera images for stereoscopy applications. Rectifying images from the two cameras (or portions of a single image, if an SVE is used) can produce rectified images such that a common point in the imaged scene can be located in a common row in both of the images.

Figure 4:
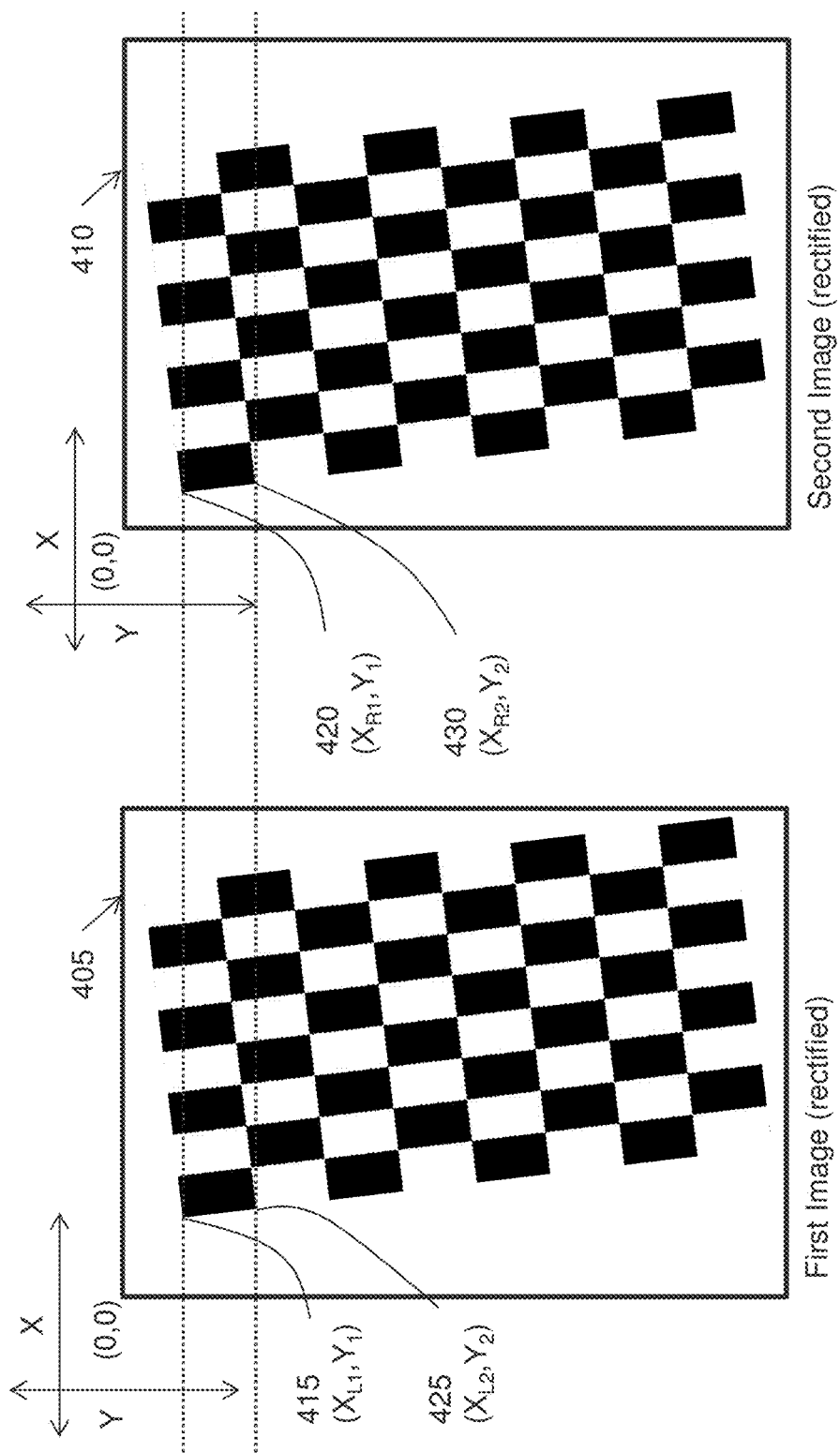
FIG. 4 illustrates rectified images of a target surface with a calibration pattern used for generating a disparity field.

In some embodiments, the technology includes generating a disparity field. A disparity field can provide mappings between the two rectified images for points on the target surface. In some embodiments, the disparity field can be an N by M array, where N is the width of the rectified images in pixels and M is the height of the rectified images in pixels. In some embodiments, the disparity field can be smaller than the size of the rectified images (e.g., when the cameras' fields of view do not cover identical portions of the target surface). FIG. 4 illustrates rectified images of a target surface with a calibration pattern used for generating a disparity field. The calibration pattern beneficially can facilitate finding corresponding points in the rectified images so that the disparity values can be calculated. First rectified image 405 can be a rectified image from a first camera and second rectified image 410 can be a rectified image from a second camera. Point 415 is located at $(X_{L1}, Y_1)$ in first rectified image 405 and represents a first corner of the calibration pattern shown. Point 420 is located at $(X_{R1}, Y_1)$ in second rectified image 410 and represents the first corner of the calibration pattern. As noted above, the same point on the target surface will be in the same row in the rectified images. In some embodiments, the disparity field for the illustrated example contains the value $X_{L1}-X_{R1}$ at the index $[X_{L1}][Y_1]$ to indicate the difference along the X axis of the location of the same point on the calibration target in first rectified image 405 and second rectified image 410. Similarly, point 425 is located at $(X_{L2}, Y_2)$ in first rectified image 405 and represents a second corner of the calibration pattern shown. Point 430 is located at $(X_{R2}, Y_2)$ in second rectified image 410 and represents the second corner of the calibration pattern. In the illustrated example, the disparity field can contain the value $X_{L2}-X_{R2}$ at the index $[X_{L2}][Y_2]$ to indicate the difference along the X axis of the location of the point on the calibration target in first rectified image 405 and second image 410. More generally, the disparity field can contain the disparity for each pair of corresponding points in the rectified images.

Figure 5:
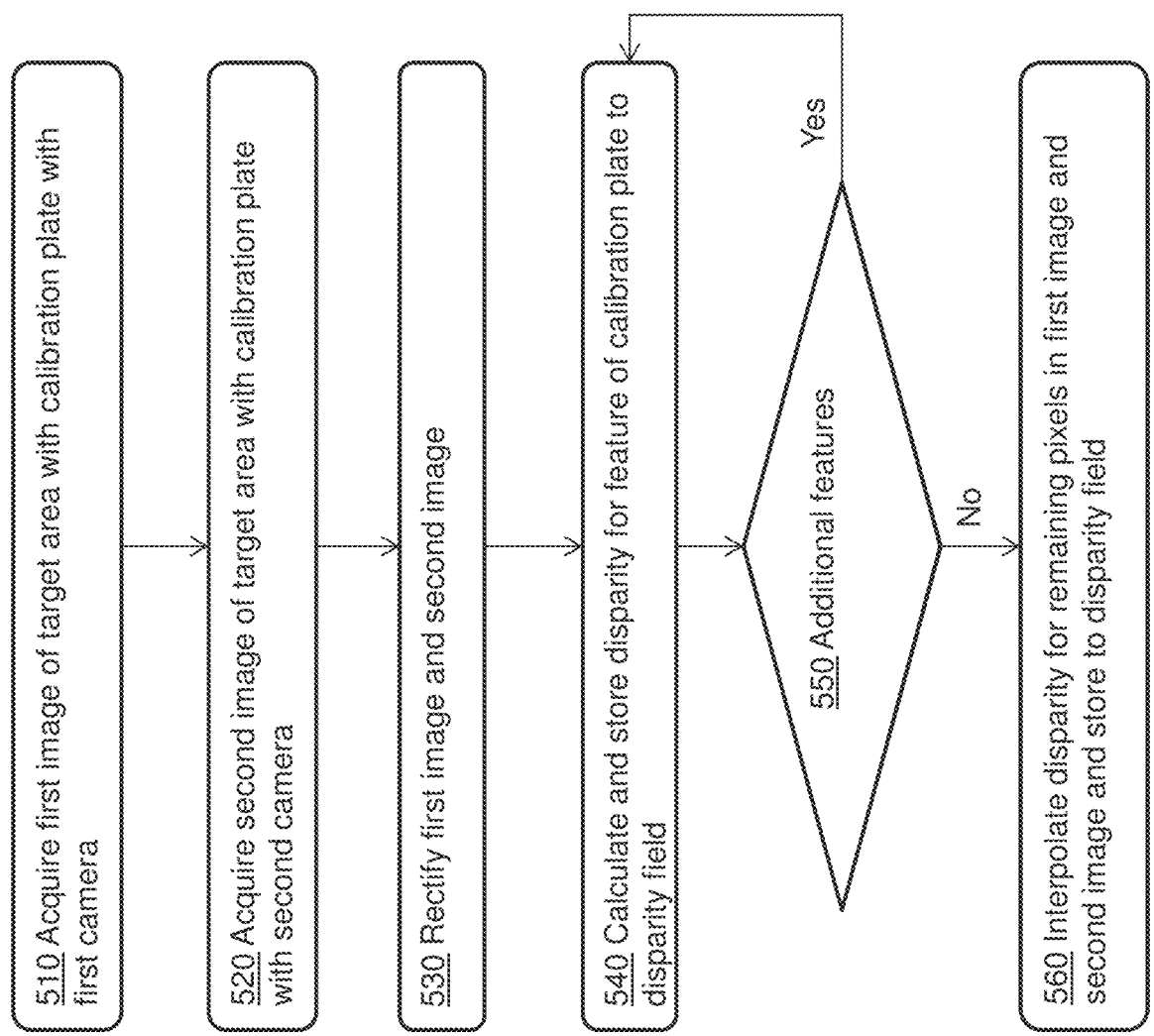
FIG. 5 depicts a flow chart for a method of generating a disparity field in accordance with the technology.

FIG. 5 depicts a flow chart for a method of generating a disparity field in accordance with the technology. At step 510, a machine vision system acquires with the first camera a first image of the target surface with a calibration pattern (e.g., a calibration plate) placed on the target surface (e.g., as illustrated in FIG. 4). At step 520, the machine vision system acquires with the second camera a second image of the target surface with the calibration pattern. Steps 510 and 520 are preferably performed with the target surface with the calibration pattern in the same position for both images. At step 530, the first image and the second image are rectified using the rectification transforms previously calculated. At step 540, the machine vision system calculates a disparity value for a feature of the calibration pattern and stores the disparity value in the disparity field. A feature (e.g., a corner on a calibration pattern) can be located in the rectified images using commercially available software, such as the Cognex Vision Library sold by the Cognex Corporation. As described above, the disparity value can be the difference in the locations along the X axis of the feature in the first rectified image and the second rectified image. At step 550, the machine vision system determines if there are any more features on the calibration pattern for which to calculate a disparity value. For example, in the case of a checkerboard calibration pattern (e.g., as illustrated in FIG. 4), a disparity value can be calculated for each of the corners in the calibration pattern. If there are additional features for which to calculate a disparity value, the method proceeds to step 540 to calculate the disparity value for the next remaining feature. If there are no more additional features, the method proceeds to step 560. At step 560, the machine vision system interpolates disparity values for remaining pixels in the first image and second image (or a portion thereof) and stores the disparity values in the disparity field.

In some embodiments, to accommodate non-planar target surfaces, the disparity field can be generated by moving a single feature around on the target surface. For example, the feature can be moved to a new location, images of the feature can be acquired, the images can be rectified, and then the disparity field can be updated at the location of the feature. In some embodiments, structured light of a known pattern projected onto the target surface can be used to populate the disparity field.

Runtime Determination of Object Presence

In some embodiments, the technology can use the information generated during calibration, such as the rectification transforms and the disparity field, along with images of the target surface to determine whether an object is present on the target surface. For example, the technology can determine if a tray passing on a conveyor belt is empty. FIG. 6 depicts a flowchart for a method of determining the presence or absence of an object on a target surface. At step 610, the machine vision system acquires a first image of the target area with a first camera. At step 620, the machine vision system acquires a second image of the target area with a second camera. Steps 610 and 620 are preferably performed with the target surface in the same position for both images. At step 630, the machine vision system rectifies the first image and the second image, e.g., using the rectification transforms generated during calibration.

At step 640, the machine vision system generates difference data based on the disparity field, the first rectified image, and the second rectified image. In some embodiments, the difference data can be an array of difference values. In some embodiments, the difference data is generated by determining the difference, if any, between the values of the pixels in the first rectified image and the values of the corresponding pixels in the second rectified image, where corresponding pixels can be determined by the disparity field. The values of the pixels can be, for example, grey scale values, hue values, gradient values, reflectance values, and/or any combination thereof.

In some embodiments, difference data can be generated by storing the difference values calculated by applying a difference function to a pixel in the first rectified image and its corresponding pixel in the second rectified image for each pair of corresponding pixels in the first rectified image and the second rectified image. For example, the following pseudo code illustrates a method of generating difference data (DifferenceImage) by applying a difference function (DIFF( )) to the values of each pixel in the first rectified image and its corresponding pixel in the second rectified image, as provided by the disparity field (DisparityField):

```
foreach x in first rectified images{
    foreach y in first rectified images {
        ExpectedDisparity = DisparityField[x][y]
        DifferenceImage[x][y] = Diff (FirstImage[x][y], SecondImage[
        x+ExpectedDisparity][y])
    }
}
```

The difference function can be any function for determining a difference in pixel values, such as grey scale values, hue values, gradient values, reflectance values, and/or any combination thereof.

Figure 7A:
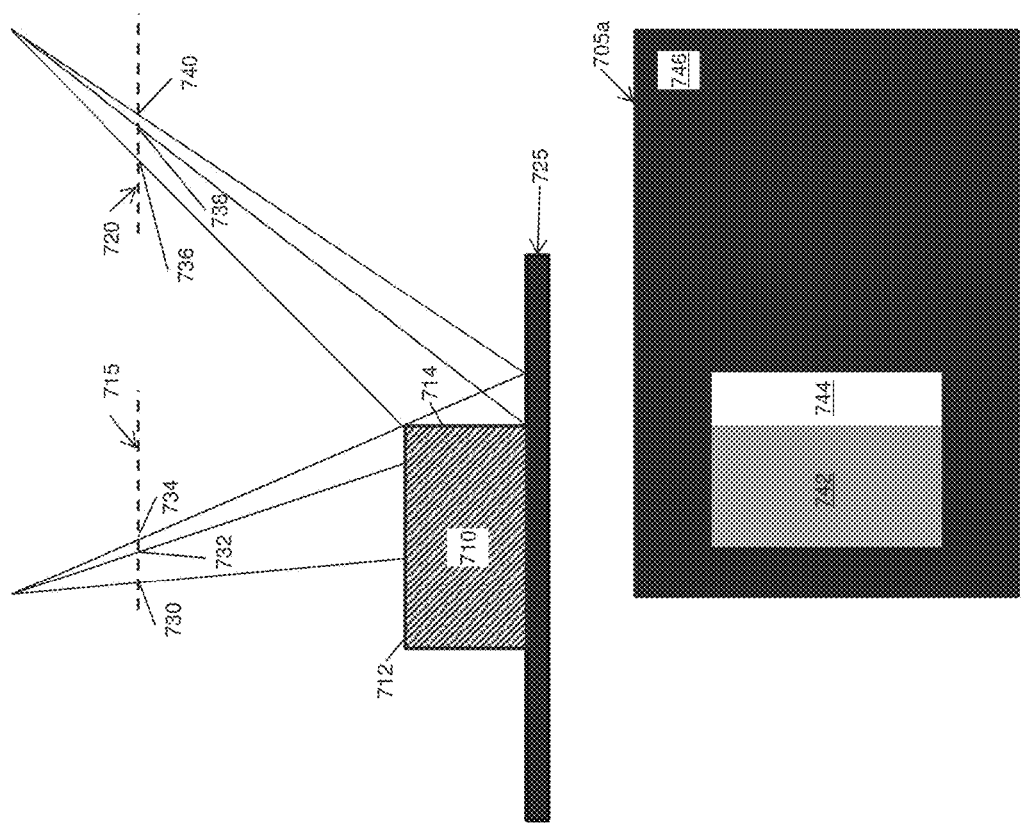
Figure 7C:
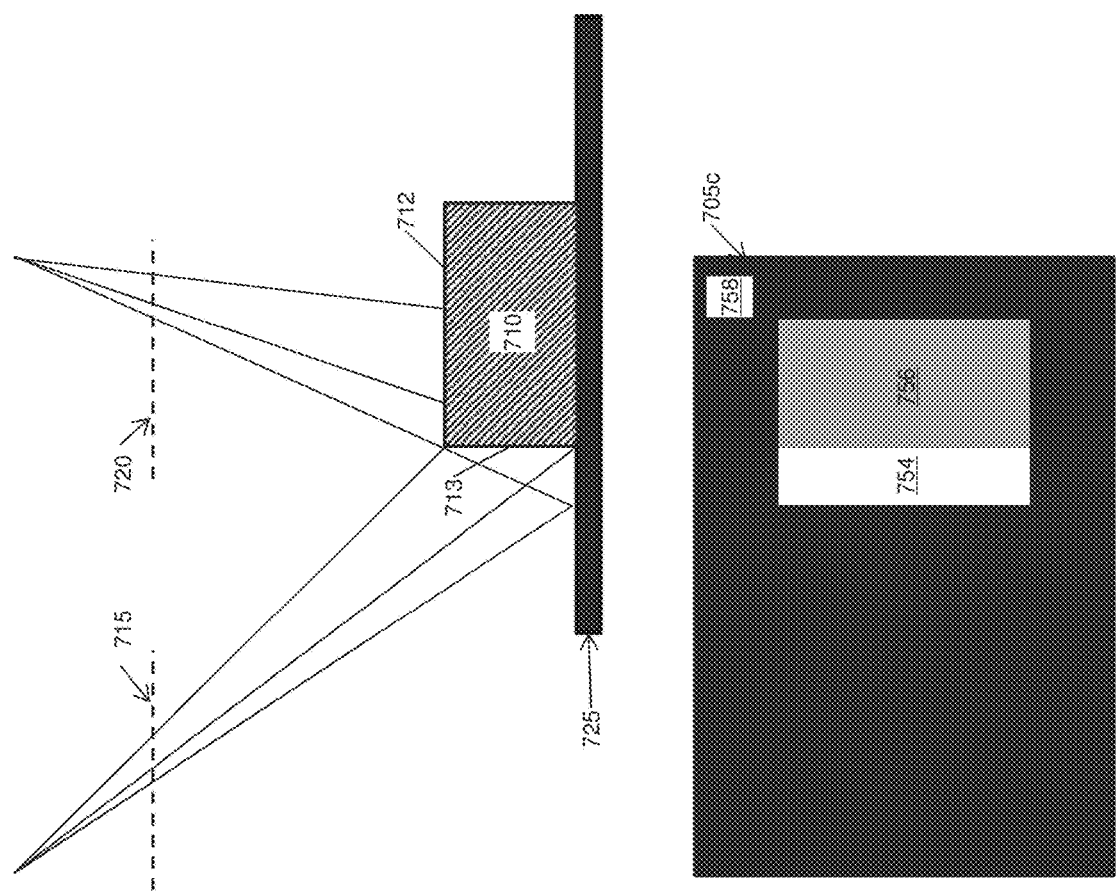

FIGS. 7A-7D illustrate difference data 705 generated when imaging target surface tray 725. In the illustrated embodiments, difference data 705 are represented as a gray scale image. Rectified image planes 715 and 720 represent the rectified image planes for two cameras (e.g., cameras 105 and 110) or a camera using an SVE (e.g., camera 205). Referring to FIGS. 7A-7C, tray 725 (carrying object 710) is illustrated at various positions relative to the fields of view of the camera(s). As illustrated in FIG. 7A, pixels at the points in rectified image plane 715 between point 730 and point 732 represent points on top 712 of object 710. The pixels at the corresponding points (e.g., as given by the disparity field) in rectified image plane 720 between point 736 and point 738 represent points on side 714 of object 710. As described above, pixels at the points between point 730 and point 732 can have different values than pixels at the corresponding points between point 736 and point 738, resulting in non-zero difference values for each pair of pixels at corresponding points. Region 742 of difference data 705a represents these non-zero difference values.

The pixels at points in rectified image plane 715 between point 732 and point 734 represent points on top 712 of object 710. The pixels at corresponding points in rectified image plane 720 between point 738 and point 734 represent points on tray 725. Pixels at the points between point 732 and point 734 can have different values than pixels at the corresponding points between point 738 and point 740 resulting in non-zero difference values for each pair of pixels at corresponding points. Region 744 of difference data 705a represents these non-zero difference values.

In the illustrated embodiment, region 742 is shown as dark grey (e.g., a lower greyscale pixel value), reflecting that the differences in pixel values at the points between point 730 and point 732 and pixel values at the corresponding points between point 736 and point 738 are relatively small (e.g., because all of the pixels represent points on similarly-colored surfaces of object 710). In contrast, region 744 is shown as light gray (e.g., a higher greyscale pixel value), reflecting that the differences in pixel values at the points between point 732 and point 734 and pixel values at the corresponding points between point 738 and point 740 are relatively high (e.g., because the pixels at points in rectified image plane 715 represent points on the surface of object 710, while the pixels at points in rectified image plane 720 represent points on tray 725). Region 746 is shown as black (e.g., grey scale pixel value of approximately 0), reflecting zero or near-zero differences in pixel values where pixels at corresponding points in rectified image plane 715 and rectified image plane 720 both represent points on tray 725.

FIG. 7B shows tray 725 and object 710 at another position relative to the camera(s). Regions 750 of difference data 705*b* represent the difference in pixel values where the pixels at points in rectified image plane 715 represent points on tray 725 and the pixels at corresponding points in rectified image plane 720 represent points on top 712 of object 710, or where the pixels at points in rectified image plane 715 represent points on top 712 of object 710 and the pixels at corresponding points in rectified image plane 720 represent points on tray 725.

Regions 752 of difference data 705*b* represent the difference in pixel values where the pixels at points in rectified image plane 715 represent points on side 713 of object 710 and the pixels at corresponding points in rectified image plane 720 represent points on top 712 of object 710, or where the pixels at points in rectified image plane 715 represent points on top 712 of object 710 and the pixels at corresponding points in rectified image plane 720 represent points on side 714 of object 712. Region 753 of difference data 705*b* represents the difference in pixel values where the pixels at points in rectified image plane 715 and the pixels at corresponding points in rectified image plane 720 represent points on the same surface of object 710, or where the pixels at points in rectified image plane 715 and the pixels at corresponding points in rectified image plane 720 represent points on tray 725.

FIG. 7C shows tray 725 and object 710 at still another position relative to the camera(s). Region 754 of difference data 705*c* represents the difference in pixel values where the pixels at points in rectified image plane 715 represent points on tray 725 and the pixels at corresponding points in rectified image plane 720 represent points on top 712 of object 710. Region 756 of difference data 705*c* represents the difference in pixel values where the pixels at points in rectified image plane 715 represent points on side 713 of object 710 and the pixels at corresponding points in rectified image plane 720 represent points on top 712 of object 710. Region 758 of difference data 705*c* represents the difference in pixel values where the pixels at points in rectified image plane 715 and the pixels at corresponding points in rectified image plane 720 represent points on the same surface of object 710, or where the pixels at points in rectified image plane 715 and the pixels at corresponding points in rectified image plane 720 represent points on tray 725.

FIG. 7D shows tray 725 when empty. Region 762 of difference data 705*d* represents the difference in pixel values where the pixels at points in rectified image plane 715 and the pixels at corresponding points in rectified image plane 720 represent points on tray 725.

Returning to FIG. 6, at step 650, the machine vision system determines the presence or absence of an object on the target surface based on the difference data. In some embodiments, a filter can be applied to the difference data to account for variations in the cameras, noise, etc. For example, the filter can set difference values in the difference data to zero if the difference values are below a threshold.

Beneficially, the application of a filter can prevent false determination of presence of an object. As described above, if there is no object on the target area, the difference data (or filtered difference data) can consist of values indicating little or no difference between the pixels of the first rectified image and the second rectified image. For example, if the first rectified image and the second rectified image comprise pixels with grey scale values of 0 to 255 and the difference function subtracts the gray scale values of corresponding pixels, then the difference data can consist of difference values that are all zero or near zero (e.g., as shown in FIG. 7D). In this instance, the difference data can appear black when rendered as a grey scale image. If there is an object on the target surface, at least a portion of the difference values in the difference data can be above zero. In this instance, the difference data can appear with non-black shapes on a black background when rendered as a grey scale image (e.g., as show in FIGS. 7A-7C).

In some embodiments, blob analysis or similar machine vision techniques can be applied to the difference data to determine whether the difference data indicates the presence of an object on the target surface. Returning to the example where the difference data is rendered as a grey scale image, if an object is present on the target surface, shapes can appear in the difference data. Blob analysis can be applied to the difference data to locate the shapes. In some embodiments, the machine vision system can interpret the presence of shapes in the difference data as an indication of an object being present on the target surface.

In some applications, it is contemplated and expected that over time, the target surface might become dirty or might accumulate stains. Beneficially, in some embodiments, the technology is not affected by changes in color to the target surface. This is because, in some embodiments, the technology differences the corresponding pixel values in the rectified images from the different fields of view.

In some applications, it is contemplated and expected that over time low lying debris (e.g., tape or labels) might accumulate on the target surface. Many users desire the technology to not be affected by low lying debris. Additionally, many users desire the technology to not be affected by vibration or small movement of the target surface as it moves over the conveyor. When either of these conditions occurs, the distance between the cameras and the surface seen by the cameras is slightly different than the distance between the cameras and the target surface at calibration time. To accommodate small changes in distance between the cameras and target surface at calibration time versus the distance between the cameras and the current surface, one of the above-described filters like blob analysis can be applied to the difference data so as to ignore small differences in the difference data resulting from the small changes in distance.

For example, referring back to FIGS. 7A-7C, it can be seen that the widths of regions 742, 744, 750, 752, 754, and 756 in difference data 705 are a function of the height of object 710. As the height of object 710 gets smaller, the widths of regions 742, 744, 750, 752, 754, and 756 in difference data 705 get narrower. Difference data for a target surface with low lying debris or with slight vibration can include non-black regions with short widths. In some embodiments, these regions can be ignored (e.g., not considered by the machine vision system when determining presence or absence of an object) by performing blob analysis and filtering out any blobs (e.g., regions) with very small widths.

In some embodiments, the machine vision processor uses a plurality of disparity fields to generate a plurality of difference data sets. The use of a plurality of disparity fields can improve the robustness of the machine vision system by accommodating variations in the shape and/or height and/or tilt and/or position of the target surface.

Differences with Classic Stereoscopy

The technology can provide benefits over classic stereoscopy. For example, classic stereoscopy can suffer from the correspondence problem. Where a first camera and a second camera are positioned to image the same scene, the correspondence problem is the need to correctly match or correspond features found in an image from the first camera to the corresponding features in an image from the second camera. Correct correspondence requires the images from the cameras to contain features or textures that can be correctly corresponded without ambiguity. For many kinds applications, the objects and scene do not provide sufficient features or textures to determine this correspondence. This yields a stereo depth image with sparse data. The sparse data may not allow correct determination of object presence or absence. In contrast, the current technology does not suffer from the correspondence problem because it does not need to match or correspond features or textures between the first and second images after calibration. The technology instead uses the disparity field.

In classic stereoscopy, a machine vision processor with substantial compute power is necessary to perform the correspondence. Beneficially, by avoiding the correspondence problem, the technology can be implemented by slower, less expensive machine vision processors.

The above-described techniques can be implemented in digital electronic circuitry, or in computer hardware, firmware, software, or in combinations of them. The implementation can be as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps can be performed by one or more programmable processors executing a computer program to perform functions of the technology by operating on input data and generating output. Method steps can also be performed by, and apparatus can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer also includes, or be operatively coupled to receive data from or transfer data to, or both, one or more mass storage devices for storing data, e.g., magnetic, magneto-optical disks, or optical disks. Data transmission and instructions can also occur over a communications network. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the above described techniques can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The above described techniques can be implemented in a distributed computing system that includes a back-end component, e.g., as a data server, and/or a middleware component, e.g., an application server, and/or a front-end component, e.g., a client computer having a graphical user interface and/or a Web browser through which a user can interact with an example implementation, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet, and include both wired and wireless networks.

The computing system can include clients and servers. A client and server are generally remote from each other and typically interact through a communication network. The relationship of client and server arises by virtue of computer programs running on the respective computers and having a client-server relationship to each other.

The technology has been described in terms of particular embodiments. The alternatives described herein are examples for illustration only and not to limit the alternatives in any way. The steps of the technology can be performed in a different order and still achieve desirable results. Other embodiments are within the scope of the following claims.

What is claimed is:

1. A machine vision system comprising:
   a first image capture device having sensor and a stereo view expander wherein the stereo view expander projects a first portion of a target surface from a first field of view on a first portion of the sensor and a second portion of the target surface from a second field of view on a second portion of the sensor, wherein the first portion of the target surface at least partially overlaps the second portion of the target surface;
   a machine vision processor connected to the first image capture device, the machine vision processor configured to:
      acquire a first image of the target surface from the first portion of the sensor;

acquire a second image of the target surface from the second portion of the sensor;

rectify the first image to form a first rectified image and rectify the second image to form a second rectified image;

retrieve a disparity field that provides mappings from a first plurality of coordinates in the first rectified image to a second plurality of coordinates in the second rectified image;

generate difference data by applying one or more difference functions to a first plurality of image elements in the first rectified image and a corresponding second plurality of image elements in the second rectified image, wherein a correspondence between an element of the first plurality of images and an element of the second plurality of images is based on the disparity field, and wherein the difference function is a function for determining a difference in pixel values, including at least one of: a difference in grey scale values, a difference in hue values, a difference in gradient values, or a difference in reflectance values; and determine a presence or an absence of an object on the target surface based on the difference data by applying a filtering algorithm to the difference data, the filtering algorithm comprising setting the plurality of difference values to zero if the plurality of difference values are below a threshold.

2. The machine vision system of claim 1, wherein the first image capture device is a camera and the camera captures the image the first portion of the target surface from the first viewpoint and the second portion of the target surface from the second viewpoint approximately simultaneously.

3. The machine vision system of claim 1, wherein the machine vision processor is configured to acquire the first image and the second image substantially simultaneously.

4. The machine vision system of claim 1, wherein the first plurality of image elements is a first plurality of pixel values.

5. The machine vision system of claim 1, wherein the target surface is one of a conveyor belt, a tray, or a receptacle.

6. The machine vision system of claim 1, wherein the machine vision processor is configured to apply a shape-finding algorithm to the difference data to determine a presence or an absence of an object on the target surface.

7. A method executed by a machine vision system comprising a sensor and a stereo view expander, the method comprising:

acquiring, by the machine vision system, a first image of the target surface from a first viewpoint and a second image of the target surface from a second viewpoint, wherein the first image is projected onto a first portion of the sensor and the second image is projected onto a second portion of the sensor by the stereo view expander;

rectifying, by the machine vision system, the first image to form a first rectified image and the second image to form a second rectified image;

retrieving, by the machine vision system, a disparity field that provides mappings from a first plurality of coordinates in the first rectified image to a second plurality of coordinates in the second rectified image;

generating, by the machine vision system, difference data by applying one or more difference functions to, a first plurality of image elements in the first rectified image to and a corresponding second plurality of image elements in the second rectified image, wherein a correspondence between an element of the first plurality of images and an element of the second plurality of images is based on the disparity field, and wherein the difference function is a function for determining a difference in pixel values, including at least one of: a difference in grey scale values, a difference in hue values, a difference in gradient values, or a difference in reflectance values; and determining, by the machine vision system, a presence or an absence of an object on the target surface based on the difference data by applying a filtering algorithm to the difference data, the filtering algorithm comprising setting the plurality of difference values to zero if the plurality of difference values are below a threshold.

8. The method of claim 7, wherein the machine vision system comprises a camera that captures the first image and the second image, wherein the camera is configured to image the target surface from the first viewpoint and image the target surface from the second viewpoint approximately simultaneously.

9. The method of claim 7, further comprising acquiring the first image and the second image substantially simultaneously.

10. The method of claim 7, wherein the first plurality of image elements is a first plurality of pixel values.

11. The method of claim 7, wherein the target surface is one of a conveyor belt, a tray, or a receptacle.

12. The method of claim 7, further comprising applying, by the machine vision system, a shape-finding algorithm to the difference data to determine a presence or an absence of an object on the target surface.

13. The machine vision system of claim 6, wherein the shape-finding algorithm comprises blob analysis.

14. The method of claim 12, wherein the shape-finding algorithm comprises blob analysis.

15. The system of claim 1 wherein the first portion of the sensor is the top half of the sensor and the second portion of the sensor is the bottom half of the sensor.

16. The method of claim 7 wherein first portion of the sensor is the top half of the sensor and the second portion of the sensor is the bottom half of the sensor.

* * * * *